June 2, 1931. R. D. AMSDEN 1,808,589
ELECTRICAL FILTER
Filed Dec. 30, 1927
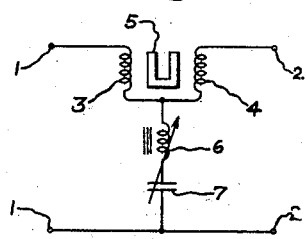
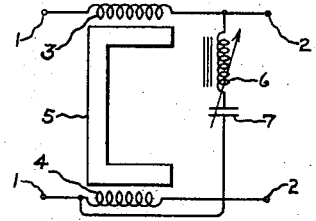
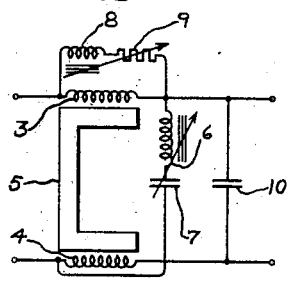
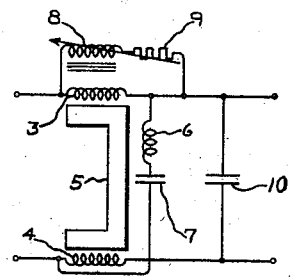
Inventor:
Ralph D. Amsden
by
His Attorney Patented June 2, 1931

1,808,589

UNITED STATES PATENT OFFICE

RALPH D. AMSDEN, OF LYNN, MASSACHUSETTS, ASSIGNOR TO GENERAL ELECTRIC COMPANY, A CORPORATION OF NEW YORK

ELECTRICAL FILTER

Application filed December 30, 1927. Serial No. 243,706.

My invention relates to electrical filters, and has for its principal object the provision of an improved filtering apparatus which is inexpensive and may be readily utilized to separate the unidirectional and alternating components of an electrical current such as that supplied from a rectifier or the like.

Various types of apparatus wherein power is supplied from an alternating current circuit through means comprising an electrical filter to a radio device or the like have been utilized in the past. Many of the filters heretofore utilized in such apparatus can not be constructed cheaply due to the fact that they comprise a considerable number of capacities and inductances interconnected with one another in a manner dependent on the frequency or frequencies of the current which it is desired to exclude from the utilization circuit. Also many of the previous circuits are so designed that a considerable amount of the desired component is bypassed thus resulting in inefficient operation of the apparatus. In accordance with my invention, these difficulties are avoided by the provision of an improved filter wherein the electromotive forces produced by the alternating component of the current are caused to neutralize one another with no bypass available for the working component.

My invention will be better understood from the following description when considered in connection with the accompanying drawings and its scope will be pointed out in the appended claims.

Referring to the drawings, Figs. 1 to 4 illustrate various types of electrical filtering apparatus wherein my invention has been embodied.

The apparatus illustrated by Fig. 1 comprises current supply terminals 1 which are connected to load terminals 2 through a filter comprising coils 3 and 4 wound on a core 5 and a coil 6 and a condenser 7 connected in series between one of the supply terminals and the junction between the coils 3 and 4.

With these connections, the alternating component of the current supplied through the terminals 1 is transmitted through the coils 3 and 6, and due to the inductive relation between the coils 3 and 4, there is produced or induced in the coil 4 an electromotive force which is neutralized by the electromotive force developed across the coil 6 and its associated condenser 7. Thus the effect at the output or load terminals of this induced voltage is neutralized and alternating current is excluded from the load or utilization circuit. In other words as regards current flow to and from the load terminals, the alternating voltages in 4 and in 6—7 are made equal and opposite in phase so that no appreciable alternating current flows through the load circuit. As indicated in Fig. 2, the coils 3 and 4 may be connected in different supply terminals with the same results in suppressing alternating current flow to and from terminals 2, that is, in the load circuit.

The filter apparatus illustrated by Fig. 3 differs from those of Figs. 1 and 2 in that a coil 8 and resistance 9 are connected in shunt with the coil 3 and in that a shunt condenser 10 is provided for excluding from the load circuit any alternating component that the current may retain after it has passed through the filter. It will of course be understood that the condenser 10 must be so proportioned that it does not resonate with the inductances connected in series with it at any frequency which is to be excluded.

A filter of the type illustrated by Fig. 1 has been found to produce extremely good results for a given condition of line and load but for general use where the load conditions vary considerably, it has been found that the coil 8 and resistor 9 (Fig. 3) tend to render the apparatus insensitive to such variations. Inasmuch as the filtering action is produced by balancing one inductive voltage against another, it is necessary that the different elements be so proportioned that this balance between the inductive voltages is maintained throughout the entire cycle of the alternating component of the current.

As indicated by Fig. 4, the coil 6 may be placed on the same core as coils 3 and 4. Other arrangements of the various parts of the apparatus in accordance with my invention will readily occur to those skilled in the art.

The embodiments of the invention illustrated and described herein have been selected for the purpose of clearly setting forth the principles involved. It will be apparent, however, that the invention is susceptible of being further modified to meet the different conditions encountered in its use and I therefore aim to cover by the appended claims all modifications within the true spirit and scope of my invention.

What I claim as new and desire to secure by Letters Patent of the United States is:

1. In an electrical circuit filter having a pair of current supply terminals and a pair of load terminals, the combination with a magnetic core, of a pair of coils wound on and inductively coupled by said core, said coils being connected in circuit in series relation between said supply and load terminals, and means for neutralizing electromotive force induced in one of said coils by current flowing in the other of said coils, said means including a third coil and a condenser connected in series with each other in shunt relation to the circuit formed by the first named coils between said supply and load terminals, said series connected coil and condenser being so related and connected at such points in the circuit that an electromotive force developed across the coil and condenser neutralizes the electromotive force simultaneously induced in said one of the first named coils.

2. In an electrical circuit filter having a pair of current supply terminals and a pair of load terminals, the combination with a magnetic core, of a pair of coils wound on and inductively coupled by said core, said coils being connected in circuit in series relation between said supply and load terminals, means for neutralizing electromotive force induced in one of said coils by current flowing in the other of said coils, said means including a third coil and a condenser connected in series with each other in shunt relation to the circuit formed by the first named coils between said supply and load terminals, said series connected coil and condenser being so related and connected at such points in the circuit that an electromotive force developed across the coil and condenser neutralizes the electromotive force simultaneously induced in said one of the first named coils, and means for rendering the filter insensitive to load current variations, said means including a fourth coil and a resistance connected in series with each other in shunt with the one of said first named coils which effects the induced voltage in the other of said first named coils.

3. An inductive filter for electrical circuits adapted to be inserted between a source of current and a load circuit and including a pair of inductively coupled coils, a common core for said coils, circuit leads connecting said coils in series relation, a coil and a condenser arranged to provide a shunt connection with said leads to apply a neutralizing voltage to one of said first named coils, and means connected in shunt with the other of said first named coils for rendering said filter insensitive to load current variations.

In witness whereof, I have hereunto set my hand this 27th day of December, 1927.

RALPH D. AMSDEN.